United States Patent
Nishimura et al.

(10) Patent No.: US 10,434,593 B2
(45) Date of Patent: Oct. 8, 2019

(54) SETTING ASSISTANCE DEVICE AND SETTING ASSISTANCE METHOD

(71) Applicant: Kobe Steel, Ltd., Hyogo (JP)

(72) Inventors: Toshihiko Nishimura, Kobe (JP); Masatoshi Hida, Kobe (JP); Takemasa Yamasaki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 497 days.

(21) Appl. No.: 15/266,607

(22) Filed: Sep. 15, 2016

(65) Prior Publication Data
US 2017/0113292 A1 Apr. 27, 2017

(30) Foreign Application Priority Data
Oct. 21, 2015 (JP) .................... 2015-207364

(51) Int. Cl.
*B23K 9/095* (2006.01)
*B23K 9/12* (2006.01)

(52) U.S. Cl.
CPC ............ *B23K 9/0953* (2013.01); *B23K 9/124* (2013.01); *Y10S 901/42* (2013.01)

(58) Field of Classification Search
CPC ...... B23K 9/095; B23K 9/0953; B23K 9/124; B23K 9/133
See application file for complete search history.

(56) References Cited

U.S. PATENT DOCUMENTS

| | | | | |
|---|---|---|---|---|
| 6,096,994 A | * | 8/2000 | Handa ................ | B23K 9/1062 219/130.5 |
| 8,592,722 B2 | * | 11/2013 | Ulrich ................ | B23K 9/0953 219/130.5 |
| 9,186,744 B2 | * | 11/2015 | Hirota ................ | B23K 9/0953 |
| 9,676,050 B2 | * | 6/2017 | Albrecht ............. | B23K 9/095 |

FOREIGN PATENT DOCUMENTS

| | | | |
|---|---|---|---|
| CN | 102581437 A | 7/2012 | |
| JP | 2001347374 A | * 12/2001 | ............ B62D 55/08 |
| JP | 2012-192431 A | 10/2012 | |
| JP | 2012192431 A | * 10/2012 | ............ B23K 9/095 |
| WO | 97/10919 A1 | 3/1997 | |

OTHER PUBLICATIONS

Machine Translation of JP-2001347374-A performed Feb. 2019 (Year: 2001).*
Machine Translation of JP-2012192431-A performed Feb. 2019 (Year: 2012).*

* cited by examiner

*Primary Examiner* — Brian W Jennison
(74) *Attorney, Agent, or Firm* — Studebaker & Brackett PC

(57) ABSTRACT

In a setting assistance device for assisting setting of a welding condition, an input receiving unit receives a new welding condition that is specified, and a reliability output unit outputs a degree of appropriateness of the new welding condition relative to a plurality of well-tested welding conditions, which are welding conditions that have been used in the past and well-tested, in response to reception of the new welding condition by the input receiving unit.

6 Claims, 10 Drawing Sheets

SETTING ASSISTANCE DEVICE AND SETTING ASSISTANCE METHOD

BACKGROUND OF THE INVENTION

1. Field of the Invention

The present invention relates to a setting assistance device and a setting assistance method for assisting setting of a welding condition.

2. Description of the Related Art

As welding processes have been automated, conditions related to welding (hereinafter, referred to as "welding conditions") have been organized into databases. To date, various technologies for organizing welding conditions into a database are known (see, for example, WO97/10919).

WO97/10919 describes an automatic welding condition setting device that sets welding operation information, sets workpiece information, retrieves welding information that coincides with retrieval information from a welding information recording unit by using the welding operation information and the workpiece information as a series of retrieval information items, calculates welding information by using a welding information calculation processor if corresponding information is not found as a result of retrieval, and performs welding by using a welding condition that is set by performing welding information retrieval or welding information calculation.

However, the condition setting device described in WO97/10919, which estimates a new welding condition, does not assure weld quality. In the end, an experienced welder performs setting and adjustment of a welding condition and checks that a satisfactory weld quality can be obtained without causing a welding defect.

On the other hand, for an inexperienced beginner, when setting and adjusting a welding condition, that is, when specifying a new welding condition, it is difficult to examine whether or not the welding condition is appropriate. Accordingly, there is a possibility that the appropriateness of a welding condition is not checked and an inappropriate welding condition may be used in an actual welding line. As a result, an unexpected welding defect may occur and may hinder the production.

SUMMARY OF THE INVENTION

An object of the present invention is to inform an operator of the appropriateness of a new welding condition when specifying the new welding condition.

To achieve the object, the present invention provides a setting assistance device for assisting setting of a welding condition. The setting assistance device includes a receiving unit that receives a new welding condition that is specified; and an output unit that outputs, to a display unit, a degree of appropriateness of the new welding condition relative to a plurality of well-tested welding conditions, which are welding conditions that have been used in the past and well-tested, in response to reception of the new welding condition by the receiving unit.

Here, the output unit may output the degree of appropriateness in accordance with a degree of remoteness of the new welding condition from a measure of central tendency of the plurality of well-tested welding conditions. In this case, the degree of remoteness may be a Mahalanobis distance between the measure of central tendency of the plurality of well-tested welding conditions and the new welding condition.

The output unit may divide welding conditions into a plurality of ranges on the basis of the plurality of well-tested welding conditions and sets the degree of appropriateness for each of the ranges, and the output unit may output the degree of appropriateness set for one of the plurality of ranges that includes the new welding condition. In this case, the plurality of ranges may be determined in accordance with a weighted sum of a plurality of items included in each of the plurality of well-tested welding conditions.

Moreover, the receiving unit may further receive attribute information related to at least one of a welding material, a welding device, and a workpiece; and the output unit may output the degree of appropriateness in accordance with the attribute information.

The present invention also provides a setting assistance method for assisting setting of a welding condition. The setting assistance method includes a step of receiving a new welding condition that is specified; and a step of outputting a degree of appropriateness of the new welding condition relative to a plurality of well-tested welding conditions, which are welding conditions that have been used in the past and well-tested, in response to reception of the new welding condition.

With the present invention, an operator is informed of the appropriateness of a new welding condition when specifying the new welding condition.

DESCRIPTION OF THE PREFERRED EMBODIMENTS

Hereinafter, an embodiment of the present invention will be described in detail with reference to the drawings.

Structure of Welding Robot System

Figure 1:
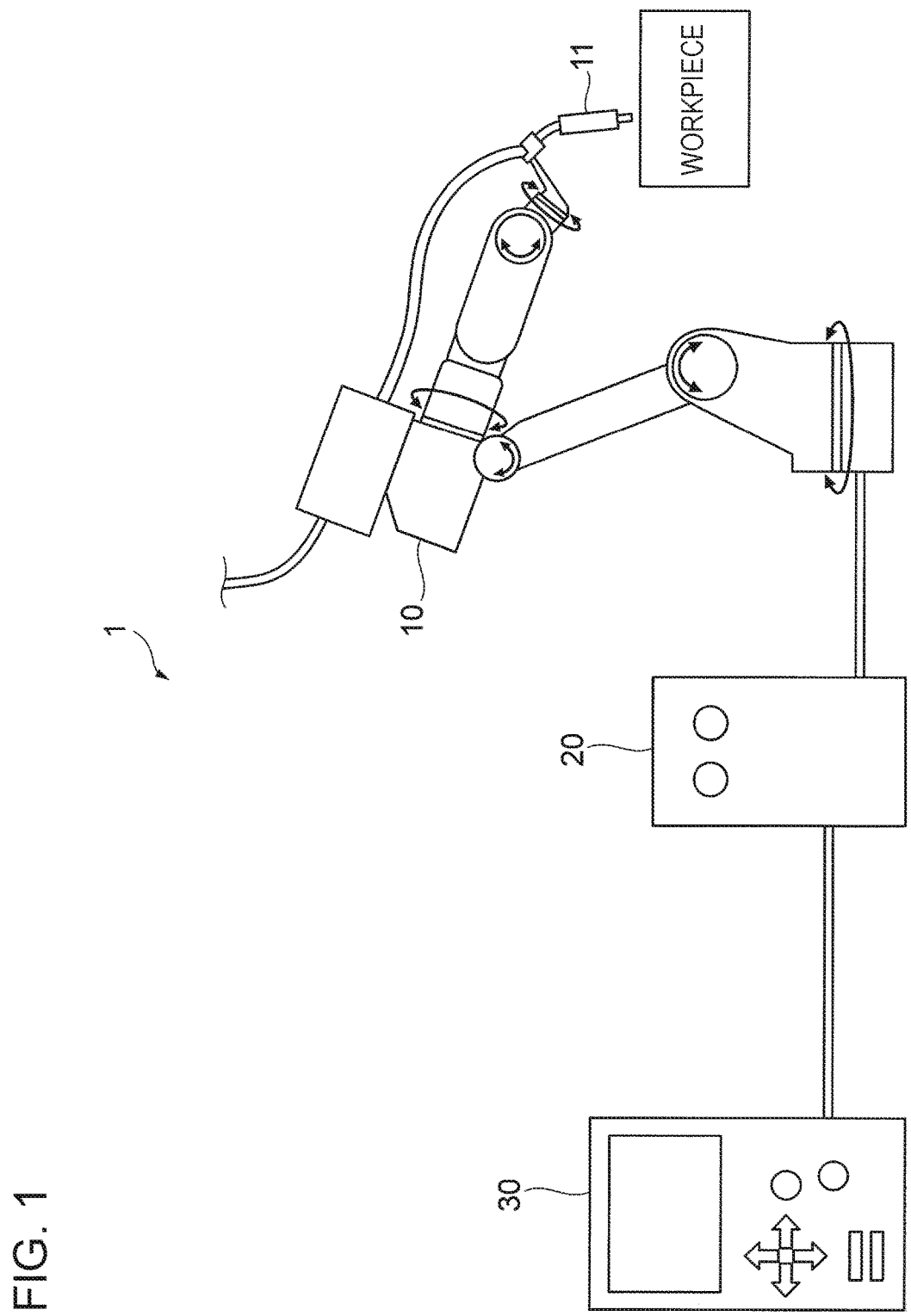
FIG. 1 illustrates an example of the schematic structure of a welding robot system according to an embodiment.

FIG. 1 illustrates an example of the schematic structure of a welding robot system 1 according to the present embodiment.

As illustrated in FIG. 1, the welding robot system 1 includes a welding robot (manipulator) 10, which welds a workpiece by using an electrode; a robot control panel 20, which controls the welding robot system 1; and a teach pendant 30, which has various keys and a liquid-crystal display panel that are used to input or output teach data for controlling the welding robot system 1.

The welding robot 10 includes an arm having a plurality of joints and performs various operations based on teach data. The welding robot 10 of the welding robot system 1 includes a welding torch 11, for welding the workpiece, at the end of the arm. The welding torch 11 feeds a welding wire to a welding groove (a groove formed between base metals of the workpiece).

The robot control panel 20, which is separated from the welding robot 10, controls the operations of various welding devices included in the welding robot system 1. For example, the robot control panel 20 controls a welding operation performed by the welding robot 10; an operation of feeding a welding wire performed by a feeding device (not shown); and an operation of supplying electric power to the electrode and to the workpiece, which is performed by a welding power source (not shown). In doing so, the robot control panel 20 controls these operations on the basis of a welding condition and the like, which are sent from the teach pendant 30. Moreover, the robot control panel 20 sends various types of information, output from the welding robot 10, to the teach pendant 30.

When an operator inputs a welding condition and the like as teach data to perform a welding operation by using the welding robot 10, the teach pendant 30 sends the welding condition and the like to the robot control panel 20. The teach pendant 30 displays various types of information, sent from the robot control panel 20, on the liquid-crystal display. In the present embodiment, the teach pendant 30 is used as an example of a display unit.

Overview of Present Embodiment

When an operator specifies a welding condition, the present embodiment assists setting of the welding condition by providing the operator with "reliability", which is an example of the degree of appropriateness of the welding condition. Hereinafter, assuming that such setting assistance is performed by a setting assistance device, the functional structure and the operation of the setting assistance device will be described. The setting assistance device may be implemented in any of the welding robot 10, the robot control panel 20, the teach pendant 30, and another apparatus different from these. Here, it is assumed that the setting assistance device is implemented in the welding robot 10.

In the present embodiment, an example in which the welding robot system 1 performs consumable electrode arc welding, in particular, metal active gas (MAG) welding will be described. In the present embodiment, it is assumed that welding devices (a welding power source, a feeding device, and the like), the composition of a shielding gas, the type and the protruding length of a welding wire, which are used by the welding robot system 1, are predetermined. Moreover, it is assumed that the shape of a joint to be welded is a "horizontal fillet weld".

Functional Structure of Setting Assistance Device

Figure 2:
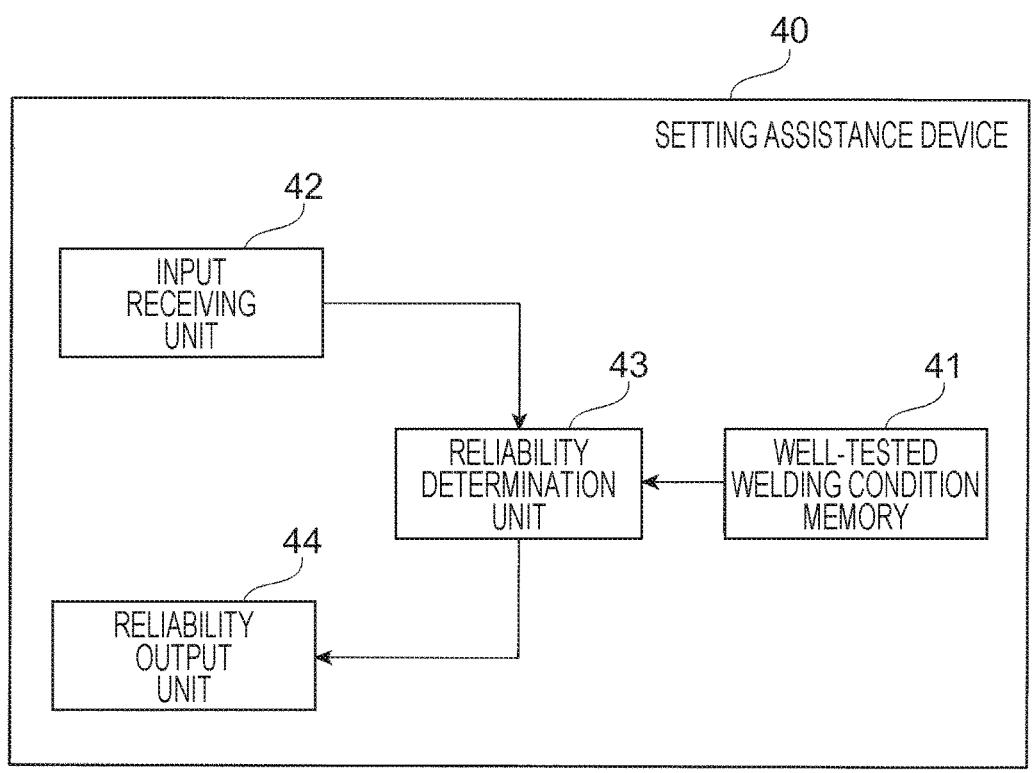
FIG. 2 illustrates an example of the functional structure of a setting assistance device according to the embodiment.

FIG. 2 illustrates an example of the functional structure of a setting assistance device 40 according to the present embodiment. As illustrated in FIG. 2, the setting assistance device 40 includes a well-tested welding condition memory 41, an input receiving unit 42, a reliability determination unit 43, and a reliability output unit 44.

The well-tested welding condition memory 41 stores a plurality of welding conditions that have been used in the past. Hereinafter, these welding conditions, which have been examined by skilled welders that no problem in weld quality occurred in experimental or actual welding operations, will be referred to as well-tested welding conditions Wn (n=1 to N).

The well-tested welding condition memory 41 may store the well-tested welding conditions Wn for each attribute information related to at least one of a welding material, a welding device, and a workpiece. Here, the attribute information related to a welding material (welding material information) includes, for example, the type, the diameter, and the protruding length of a welding wire. The attribute information related to a welding device (welding device information) includes, for example, the characteristics of a welding power source and the type of a shielding gas. The attribute information related to a workpiece (workpiece information) includes, for example, the material, the thickness, the shape of a welding groove, the shape of a joint, and the welding position of the workpiece.

When an operator inputs information by using the teach pendant 30 and confirms the input by depressing a setting key, the input receiving unit 42 receives the information from the teach pendant 30. In particular, the input receiving unit 42 receives, as such information, a welding condition that is used by the welding robot 10 to perform welding. Hereinafter, this welding condition, which is a new welding condition that is different from the well-tested welding conditions Wn, will be referred to as a new welding condition Win.

The input receiving unit 42 may receive the new welding condition Win so as to be associated with attribute information that is at least one of welding material information, welding device information, and workpiece information.

In the present embodiment, the input receiving unit 42 is used as an example of a receiving unit that receives a new welding condition that is specified.

When the input receiving unit 42 receives the new welding condition Win, the reliability determination unit 43 determines the reliability Rin of the new welding condition Win by using the well-tested welding conditions Wn stored in the well-tested welding condition memory 41. The reliability Rin may be, for example, a single numerical value representing the reliability, the stability, and the repeatability of the new welding condition Win. Here, the reliability means the ability to suppress a welding defect and to obtain high weld quality by using the welding condition. The stability means the ability to maintain high weld quality when the shape (the thickness or the dimensional gap width) of a workpiece changes or the characteristics of a welding device (electric current, voltage, and the like) change to a small degree. The repeatability means the ability to obtain the same welding result when the welding condition is repeatedly used.

The reliability determination unit 43 may determine the reliability Rin of the new welding condition Win by using the well-tested welding conditions Wn stored in the well-tested welding condition memory 41 for attribute information that is at least one of welding material information, welding device information, and workpiece information and that is associated with the new welding condition Win. The reliability determination unit 43 may use, as a method of determining the reliability Rin, different methods for welding material information, welding device information, and workpiece information.

The reliability output unit 44 provides the operator with the reliability Rin, determined by the reliability determination unit 43, by outputting the reliability Rin to the teach pendant 30. In the present embodiment, the reliability output unit 44 is used as an example of an output unit that outputs the degree of appropriateness.

Welding Condition Used in Setting Assistance Device

Examples of items of a welding condition used by the setting assistance device 40 include, concerning the output of a welding device, a welding current I [A], a welding voltage V [V], and a welding wire feed speed Vw [mm/sec]. Examples of items include, concerning the manipulation of the welding torch 11, a welding speed S [mm/sec], and a weaving pattern Pw(t) [mm], a weaving amplitude Aw [mm], and a weaving frequency Fw [Hz]. Examples of items include, concerning the target of the end of the welding torch 11, a target position offset X [mm] and a target angle θ [rad]. Here, the target position offset X and the target angle θ are respectively an offset and an angle in a plane. However, these may be an offset and an angle in a three-dimensional space. The number of layers and the number of paths may be associated with these welding conditions, or these welding conditions may differ from each other from path to path.

Figure 3A:
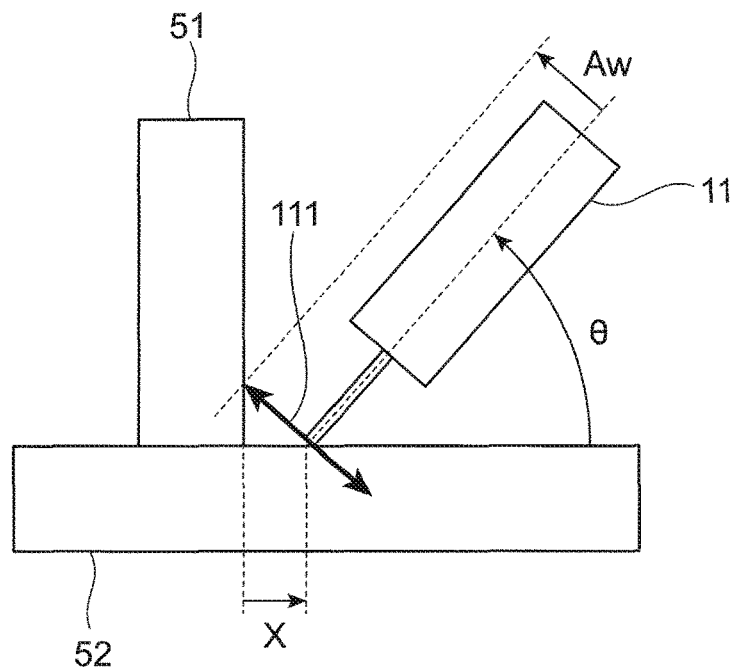
FIG. 3A illustrates a weaving amplitude, a target position offset, and a target angle, which are included in a welding condition used by the setting assistance device.
Figure 3B:
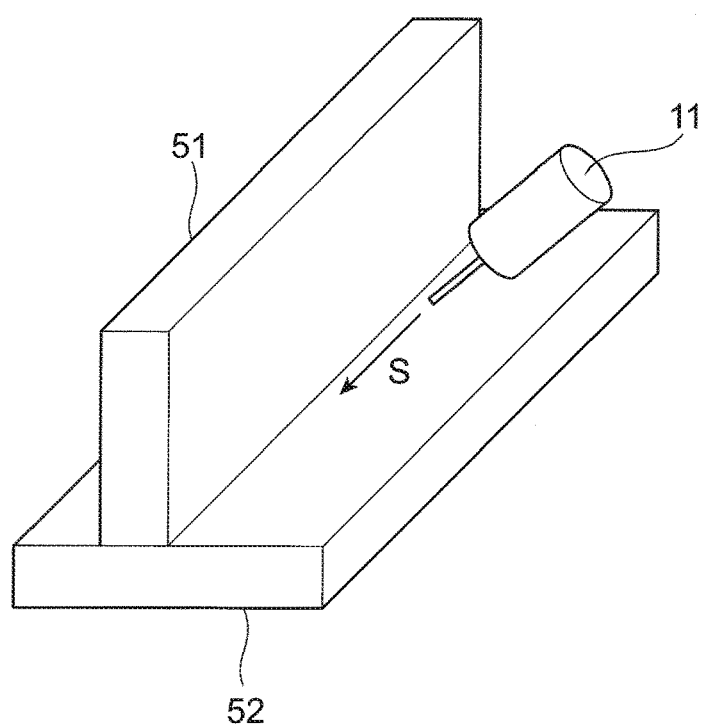
FIG. 3B illustrates a welding speed, which is included in a welding condition used by the setting assistance device.

FIGS. 3A and 3B illustrate some of these welding conditions. Here, it is assumed that the X-axis extends in a direction perpendicular to the plate surface of a base metal 51, the Y-axis extends in a direction perpendicular to the plate surface of a base metal 52, and the Z-axis extends in a direction perpendicular to the X-axis and the Y-axis.

FIG. 3A illustrates the weaving amplitude Aw, the target position offset X, and the target angle θ, which are included in the aforementioned welding conditions. FIG. 3A illustrates the positional relationship among the base metal 51, the base metal 52, and the welding torch 11 as seen in the Z-axis direction. That is, the target position offset X and the target angle θ are an offset and an angel in the XY-plane.

FIG. 3B illustrates the welding speed S, which is included in the aforementioned welding conditions. As illustrated in FIG. 3B, the welding speed S is a speed in the Z-axis direction.

Operation of Setting Assistance Device

Figure 4:
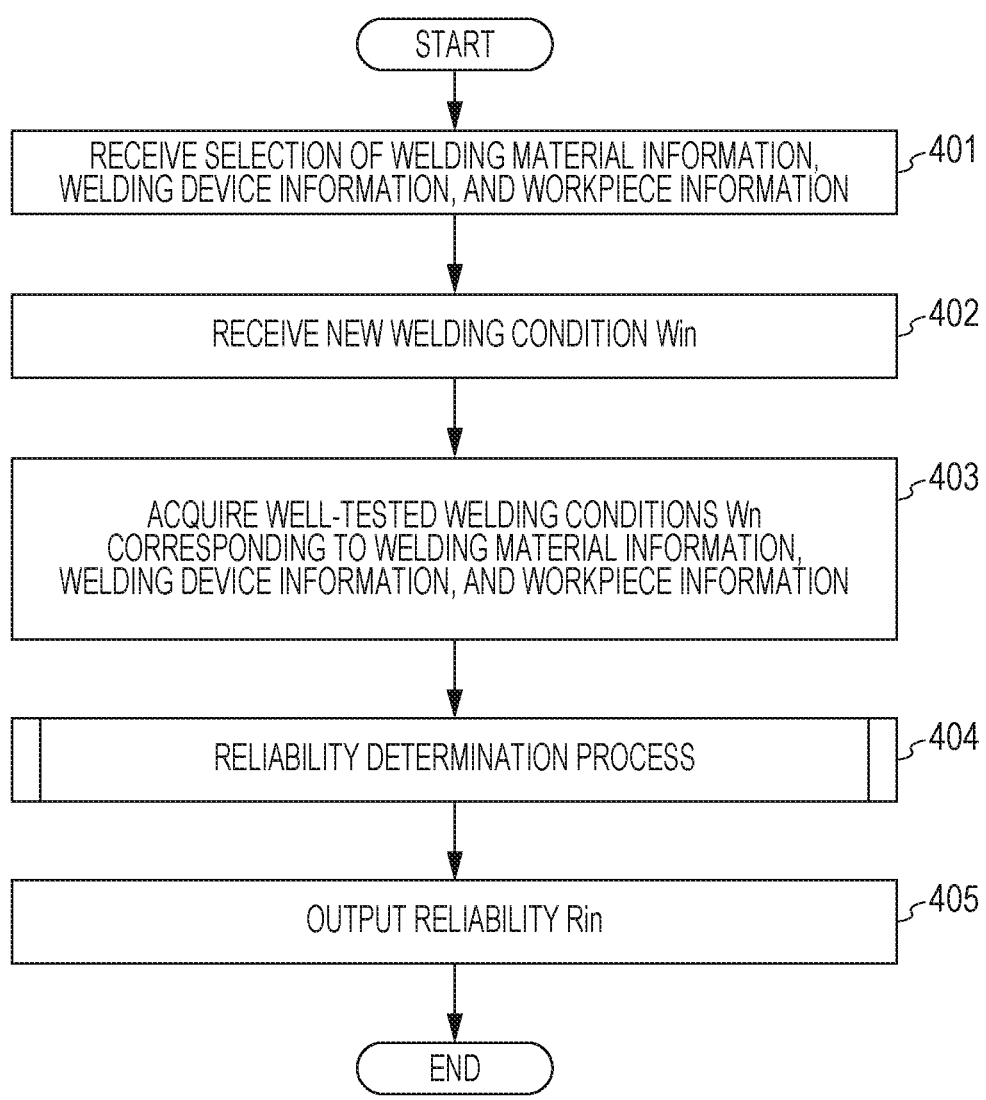
FIG. 4 is a flowchart illustrating an example of an operation performed by the setting assistance device according to the embodiment.

FIG. 4 is a flowchart illustrating an example of an operation performed by the setting assistance device 40 according to the present embodiment.

First, when an operator selects welding material information, welding device information, and workpiece information by using the teach pendant 30, the input receiving unit 42 of the setting assistance device 40 receives the selection from the teach pendant 30 (step 401). For example, if the operator selects "horizontal fillet weld" as the shape of a joint, the input receiving unit 42 receives the selection of "horizontal fillet weld". On the other hand, the operator need not select predetermined information items, such as a welding device, the composition of a shielding gas, the type and the protruding length of a welding wire, by using the teach pendant 30. Instead, the input receiving unit 42 may select such information items.

Next, when the operator moves the robot to a welding joint portion and inputs a new welding condition Win, the input receiving unit 42 of the setting assistance device 40 receives the new welding condition Win (step 402). Here, the new welding condition Win may include a welding current, a welding voltage, and a welding wire feed speed. The new welding condition Win may include a welding speed, a weaving pattern, a weaving amplitude, and a weaving frequency. The new welding condition Win may further include a target position offset and a target angle of the end of the welding torch 11.

Then, the reliability determination unit 43 retrieves well-tested welding conditions Wn that correspond to the welding material information, the welding device information, and the workpiece information, which have been received in step 401, by searching the well-tested welding condition memory 41 by using the welding material information, the welding device information, and the workpiece information as a key (step 403).

The reliability determination unit 43 performs a reliability determination process for determining the reliability Rin (step 404). The reliability determination process, which is a process for determining the reliability Rin on the basis of the new welding condition Win received in step 402 and the well-tested welding conditions Wn retrieved in step 403, will be described below in detail.

Subsequently, the reliability output unit 44 outputs the reliability Rin, determined in step 404, to the teach pendant 30 (step 405). Then, the teach pendant 30 displays the reliability Rin on the liquid-crystal display, so that the operator is informed of the reliability Rin. If the reliability Rin is lower than or equal to a threshold, the teach pendant 30 may issue a warning or may prohibit inputting of the welding condition, in addition to or instead of displaying the reliability Rin. Here, examples of a case where the reliability Rin of a new welding condition Win is lower than or equal to a threshold include a case where the new welding condition Win is in a region 3, which is outside a weldable limit Wlim, in a second reliability determination process described below.

Hereinafter, the reliability determination process will be described in detail.

First Reliability Determination Process

The first reliability determination process is a process of calculating the reliability on the basis of the deviation, which is an example of the degree of remoteness, of a new welding condition Win from the measure of central tendency of the well-tested welding conditions Wn. In this process, the reliability determination unit 43 calculates the measure of central tendency Wx (for example, the mean, the median, or the mode) of the well-tested welding conditions Wn on the basis of the distribution of the well-tested welding conditions Wn stored in the well-tested welding condition memory 41. Then, the reliability determination unit 43 calculates the deviation ΔW of the new welding condition Win from the measure of central tendency Wx. Subsequently, the reliability determination unit 43 determines the reliability Rin in accordance with the deviation ΔW. To be specific, the reliability determination unit 43 determines the reliability Rin so that the reliability Rin increases as the deviation ΔW decreases, that is, the new welding condition Win is closer to the measure of central tendency.

When calculating the deviation ΔW as described above, a weldable limit Wlim, which is a limit line of welding conditions that allow welding, may be used. The weldable limit Wlim may be set for each of welding material information, welding device information, and workpiece information. The weldable limit Wlim may be manually set.

When calculating the reliability Rin, the items of a welding condition may be weighted. The weights may be set for each of welding material information, welding device information, and workpiece information.

Figure 5:
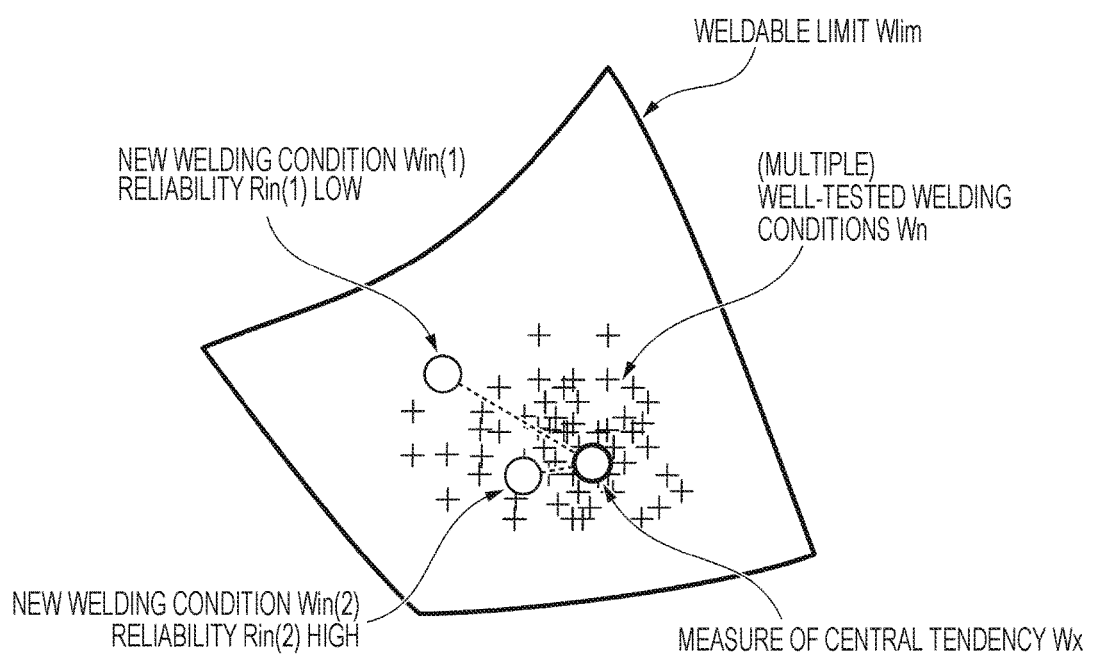
FIG. 5 schematically illustrates a method of determining reliability in a first reliability determination process.

FIG. 5 schematically illustrates a method of determining the reliability Rin in the first reliability determination process. As illustrated in FIG. 5, multiple well-tested welding conditions Wn exist in the weldable limit Wlim, and the measure of central tendency Wx of the well-tested welding conditions Wn has been calculated. The reliability Rin(1) of a first new welding condition Win(1) is low, because Win(1) is remote from the measure of central tendency Wx. The reliability Rin(2) of a second new welding condition Win(2) is high, because Win(2) is close to the measure of central tendency Wx.

Here, as an example of the first reliability determination process, a method of quantitatively measuring the deviation ΔW of a new welding condition Win from the measure of central tendency of the well-tested welding conditions Wn by using the Mahalanobis distance, which is known in statistics, will be described. The Mahalanobis distance is the same as the generally used Euclidean distance in that these distances both represent the similarity between a new multivariable sample (input data) and a known multivariable sample (existing data). However, the Mahalanobis distance differs from the Euclidian distance in that the Mahalanobis distance takes the correlation (variance) of data into consideration.

Figure 6:
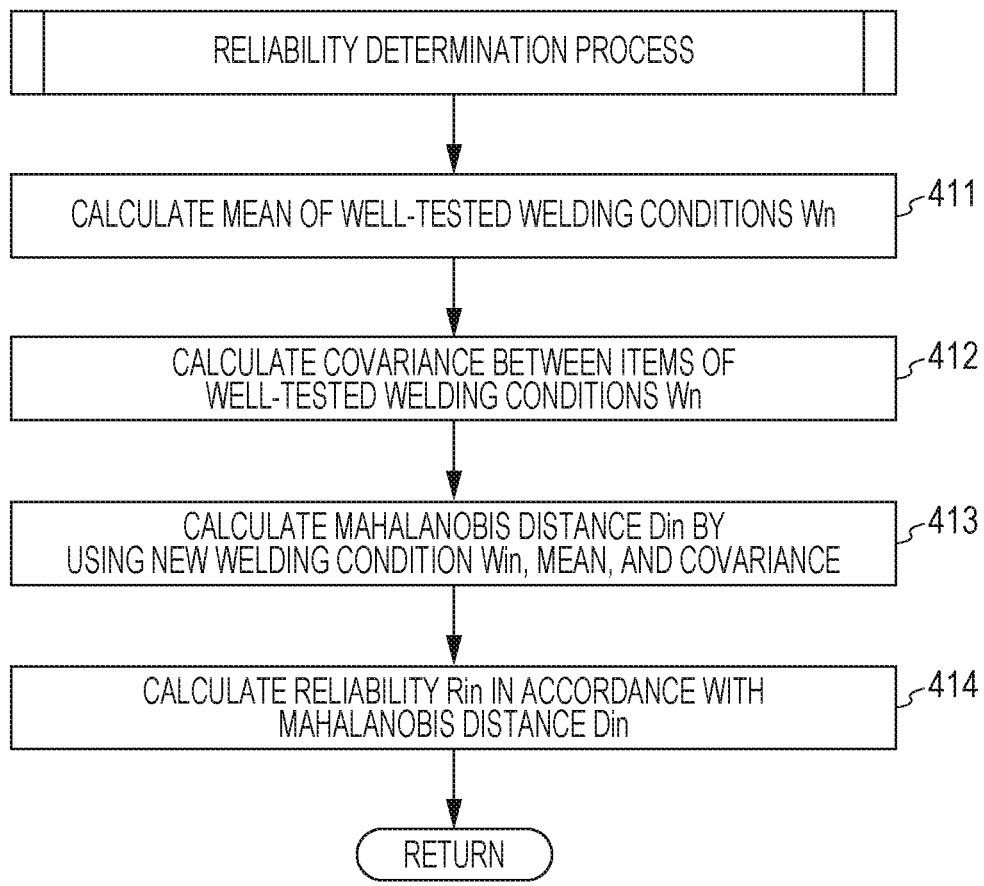
FIG. 6 is a flowchart illustrating an example of a series of steps performed when an example of the first reliability determination process is used.

FIG. 6 is a flowchart illustrating an example of a series of steps of the first reliability determination process in this case.

As illustrated in FIG. 6, first, the reliability determination unit 43 calculates the mean "(ΣWn)/N" of the well-tested welding conditions Wn (n=1 to N) (step 411). The reliability determination unit 43 calculates the covariance between the items of the well-tested welding conditions Wn (step 412). Then, the reliability determination unit 43 calculates the Mahalanobis distance Din by using the new welding condition Win, the mean calculated in step 411, and the covariance calculated in step 412 (step 413).

Subsequently, the reliability determination unit 43 calculates the reliability Rin in accordance with the Mahalanobis distance Din calculated in step 413 (step 414). To be specific, the reliability determination unit 43 may calculate the reliability Rin by using an equation such that the reliability Rin increases as the Mahalanobis distance Din decreases, that is, as the new welding condition Win is closer to the well-tested welding conditions Wn. An example of such an equation is "Rin=100-α×Din". Since the Mahalanobis distance Din has a positive value, by using a positive constant α (for example, α=100), this equation can express the reliability Rin as a percentage.

In the method described above, the reliability Rin is calculated by using the Mahalanobis distance Din. However, this is not a limitation. Instead of using the Mahalanobis distance, the reliability Rin can be calculated by using another statistical method, such as principal component analysis.

Second Reliability Determination Process

The second reliability determination process is a process in which welding conditions are divided into a plurality of regions (ranges), a reliability is set for each region, and the reliability Rin of the new welding condition Win is determined. In this process, the reliability determination unit 43 sets a weldable limit Wlim, which is the limit line of welding conditions that allow welding. Moreover, the reliability determination unit 43 sets an appropriate condition limit Wa, which is the limit line of appropriate welding conditions, on the basis of the distribution of the well-tested welding conditions Wn stored in the well-tested welding condition memory 41. Then, the reliability determination unit 43 determines the reliability Rin by using the positional relationship among the new welding condition Win, the weldable limit Wlim, and the appropriate condition limit Wa.

In this case, the weldable limit Wlim may be determined by using the following parameters. First, the rated values of welding devices used by the welding robot system 1 may be used as the parameters. Examples of the rated values include the upper limit of the current or voltage of the welding power source and the upper limit of the wire feed speed of the feeding device. Second, the mechanical limit values of the welding robot 10 may be used as the parameters. Examples of the mechanical limit values include the upper limit of the movement speed of the welding torch 11 and the upper limit of the weaving period or the weaving frequency. Third, conditions that do not allow welding may be used as the parameters. Examples of such conditions include the lower limit of the current or voltage of the welding power source that can generate an arc. Fourth, conditions that clearly cause a welding defect may be used as the parameters. Examples of such conditions include the upper limit of the current or the voltage of the welding power source that makes the weld disposition rate or the heat input excessive. The weldable limit Wlim may be set for each of welding material information, welding device information, and workpiece information. The weldable limit Wlim may be manually set.

The appropriate condition limit Wa may be determined by quantifying the operational know-how of an experienced welder or may be determined by using principal component analysis as described below. The appropriate condition limit Wa may be set for each of welding material information, welding device information, and workpiece information. The appropriate condition limit Wa may be manually set.

Figure 7:
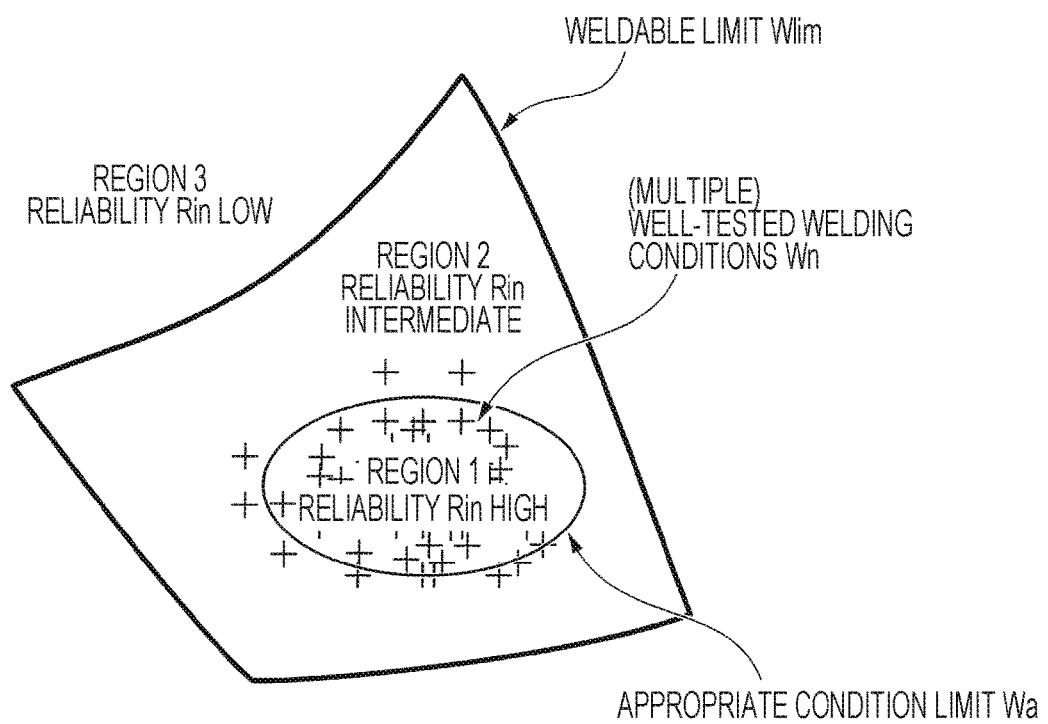
FIG. 7 schematically illustrates a method of determining reliability in a second reliability determination process.

FIG. 7 schematically illustrates a method of determining the reliability Rin in the second reliability determination process. As illustrated in FIG. 7, a multivariable space having the items of a welding condition as its variables is divided into three regions by the weldable limit Wlim and the appropriate condition limit Wa. To be specific, a region 1 is a region inside the appropriate condition limit Wa, a region 2 is a region outside the appropriate condition limit Wa and inside the weldable limit Wlim, and a region 3 is a region outside the weldable limit Wlim. If the new welding condition Win is in the region 1, the reliability Rin has the highest value; if the new welding condition Win is in the region 2, the reliability Rin has the next highest value; and, if the new welding condition Win is in the region 3, the reliability Rin has the lowest value.

Here, as an example of the second reliability determination process, a method in which the appropriate condition limit Wa is obtained by performing principal component analysis (PCA) of accumulated well-tested welding conditions Wn will be described. Principal component analysis is a method of removing correlation between data items that are represented by multiple variables to reduce the variables to a small number of uncorrelated composite variables. By using principal component analysis, it is possible to characterize data by using a smaller number of variables.

Here, a method of analyzing the well-tested welding conditions Wn when weaving is not performed will be described. In this case, it is assumed that the well-tested welding conditions Wn each have the following five items: the welding current In [A], the welding voltage Vn [V], the welding speed Sn [mm/sec] of the welding torch 11, the target position offset Xn [mm] of the welding torch 11, and the target angle θn [rad] of the welding torch 11. In principal component analysis, a composite variable U is defined as "$U=A1\times I+A2\times V+A3'S+A4\times X+A5\times\theta$". Here, A1 to A5 are weights that satisfy "$A1^2+A2^2+A3^2+A4^2+A5^2=1$".

Figure 8:
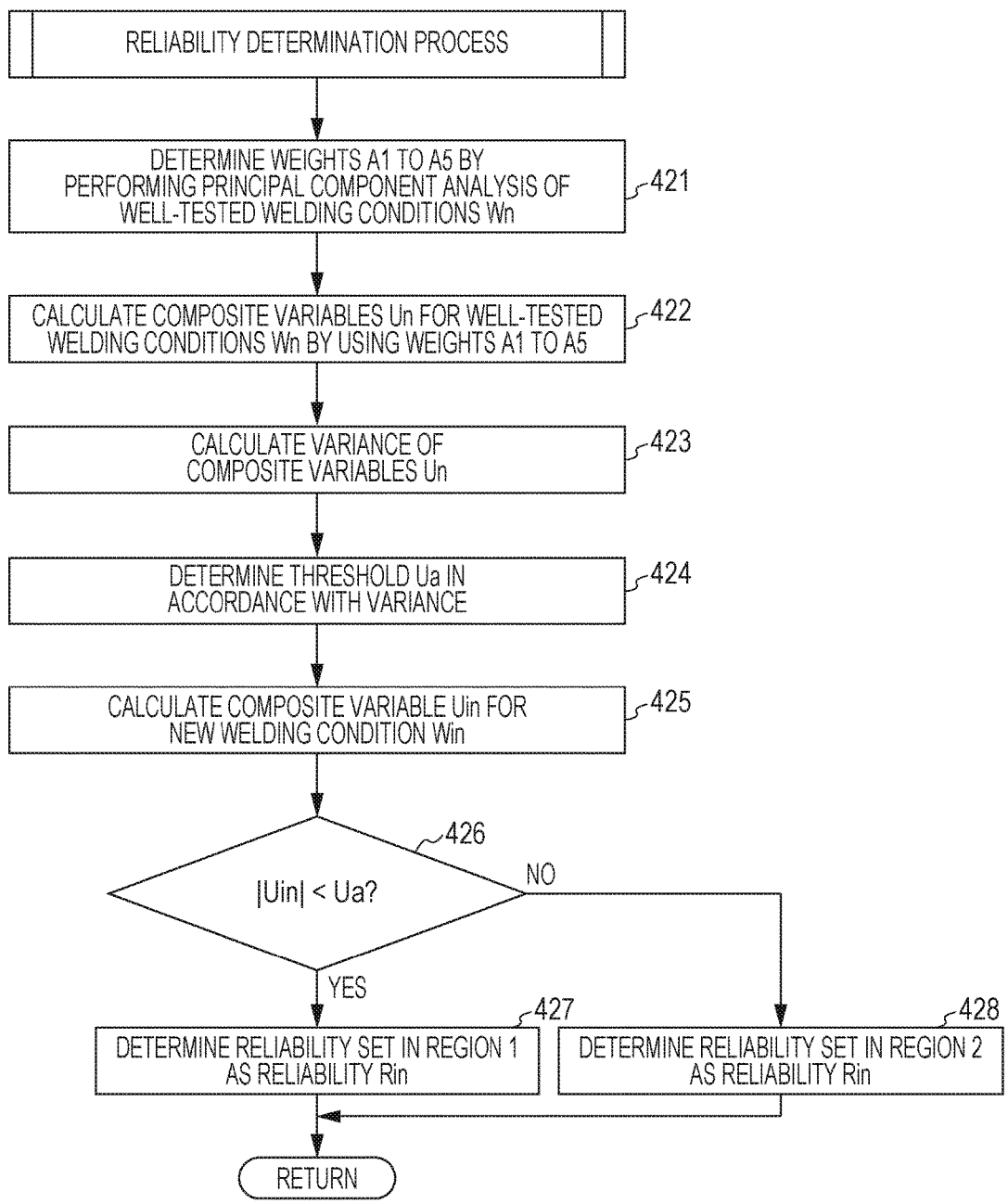
FIG. 8 is a flowchart illustrating an example of a series of steps performed when an example of the second reliability determination process is used.

FIG. 8 is a flowchart illustrating an example of a series of steps of the second reliability determination process in this case. Here, it is assumed that the new welding condition Win does not exist in the region 3, which is outside the weldable limit Wlim. That is, on this assumption, this flowchart illustrates a case where the reliability Rin of the new welding condition Win is determined by determining whether the reliability Rin of the new welding condition Win exists in the region 1, which is inside of the appropriate condition limit Wa, or in the region 2, which is outside the appropriate condition limit Wa.

As illustrated in FIG. 8, first, the reliability determination unit 43 determines the weights A1 to A5 by performing principal component analysis of the well-tested welding conditions Wn (n=1 to N) (step 421). Then, by using the determined weights A1 to A5, the reliability determination unit 43 calculates the composite variables Un (n=1 to N) for the well-tested welding conditions Wn (n=1 to N) (step 422). To be specific, the composite variables Un (n=1 to N) are calculated by using an equation "$Un=A1\times In+A2\times Vn+A3\times Sn+A4\times Xn+A5\times\theta n$". Moreover, the reliability determination unit 43 calculates the variance of the composite variables Un (n=1 to N) (step 423). Then, in accordance with the variance, the reliability determination unit 43 determines a threshold Ua that is used to determine the appropriate condition limit Wa (step 424).

Subsequently, the reliability determination unit 43 calculates a composite variable Uin for the new welding condition Win (step 425). The reliability determination unit 43 determines the appropriate condition limit Wa by using the relationship between the magnitudes of the composite variable Uin and the threshold Ua. That is, the reliability determination unit 43 determines whether or not the absolute value of the composite variable Uin is smaller than the threshold Ua (>0) determined in step 424 (step 426). That is, the reliability determination unit 43 determines whether or not an inequality "$-Ua<Uin<Ua$" holds.

If it is determined that the absolute value of the composite variable Uin is smaller than the threshold Ua, the reliability determination unit 43 determines that the new welding condition Win is in the region 1 inside the appropriate condition limit Wa, and determines that a reliability set in the region 1 is the reliability Rin of the new welding condition Win (step 427).

On the other hand, if it is determined that the absolute value of the composite variable Uin is not smaller than the threshold Ua, the reliability determination unit 43 determines that the new welding condition Win is in the region 2 outside the appropriate condition limit Wa, and determines that a reliability set in the region 2 is the reliability Rin of the new welding condition Win (step 428)

In this flowchart, the setting assistance device 40 performs the steps 421 to 424. However, this is not a limitation. The weights A1 to A5 and the threshold Ua may be calculated beforehand and set as constants in the setting assistance device 40. In this case, it is not necessary for the setting assistance device 40 to perform the steps 421 to 424. Moreover, in this case, it is not necessary to store the well-tested welding conditions Wn in the well-tested welding condition memory 41. Accordingly, the present embodiment can be used in an inexpensive welding robot or welding apparatus having small memory capacity and low calculation ability.

The second reliability determination process may be modified as follows.

Figure 9:
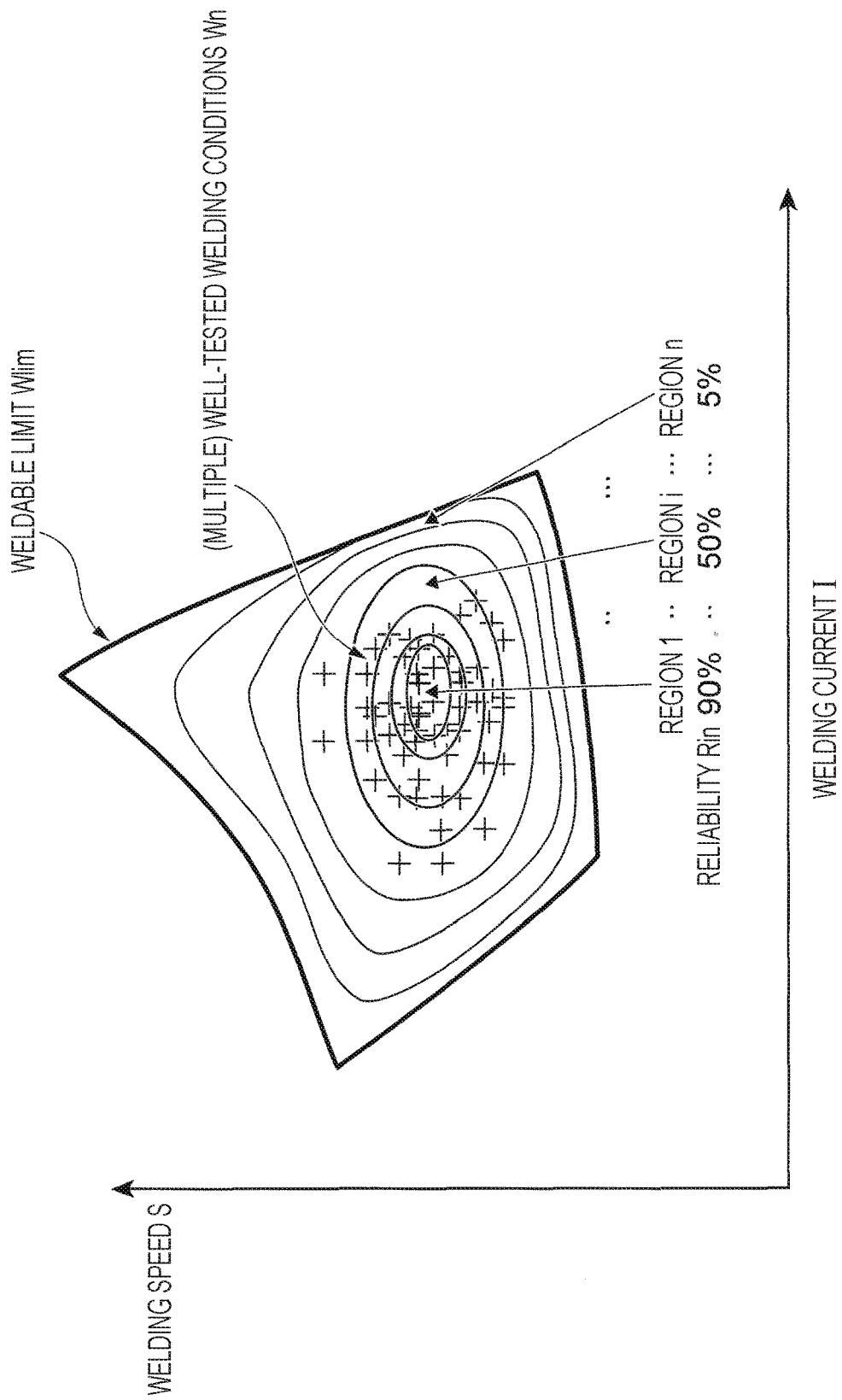
FIG. 9 schematically illustrates a method of determining reliability in a modification of the second reliability determination process.

FIG. 9 schematically illustrates a method of determining the reliability Rin in the modification of the second reliability determination process. In FIG. 9, the regions shown in FIG. 7 are further divided into a region 1, a region 2, . . . , and a region n. Reliability 1, reliability 2, . . . , and reliability n, which satisfy an inequality "reliability 1>reliability 2>>reliability n" are respectively set for the region 1, the region 2, . . . , and the region n.

Although this is not a limitation, FIG. 9 illustrates a case where only the welding current I [A] and the welding speed S [mm/sec], which are items of a welding condition that have significant effect on the weld quality, are selected, and the reliability Rin is obtained in a two-dimensional I-S plane.

In this modification, the reliability determination unit 43 makes a reliability map in which the measure of central tendency of the welding current In and the welding speed Sn of the well-tested welding conditions Wn (n=1 to N) corresponds to the maximum reliability Rmax (=100%), and the weldable limit Wlim corresponds to the minimum reliability Rmin (=0%). Here, the reliability map is a contour figure showing lines each connecting points having the same reliability. The reliability determination unit 43 determines in which region of the reliability map the welding current Iin and the welding speed Sin of the new welding condition Win are located by using the I-S plane, and obtains the reliability Rin.

Figure 10:
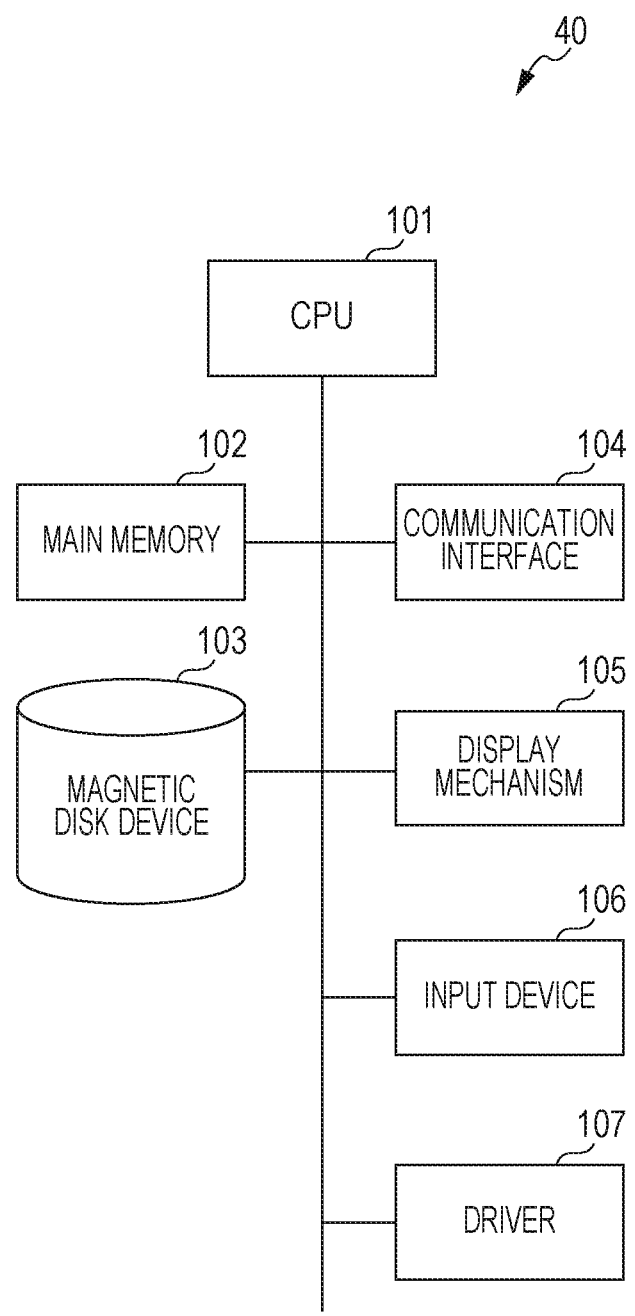
FIG. 10 illustrates an example of the hardware structure of the setting assistance device according to the embodiment.

Next, the hardware structure of the setting assistance device 40 will be described. FIG. 10 illustrates an example of the hardware structure of the setting assistance device 40.

As illustrated in FIG. 10, the setting assistance device 40 is implemented, for example, in a general-purpose personal computer (PC) or the like. The setting assistance device 40 includes a CPU 101, which is calculation means; and a main memory 102 and a magnetic disk device (hard disk drive (HDD)) 103, each of which is storage means. Here, the CPU 101 executes programs, such as an operating system (OS) and application software, and realizes various functions of the setting assistance device 40. The main memory 102 is a memory area for storing various programs and data used by the programs. The HDD 103 is a memory area for storing data input to various programs and data output from the programs.

The setting assistance device 40 includes a communication interface 104, which is used for communication with the outside; a display mechanism 105, which includes a video memory, a display panel, and the like; an input device 106, which includes a keyboard, a mouse, and the like; and a driver 107, which performs reading/writing of data from/to a storage medium. The hardware structure of the setting assistance device 40 is not limited to the structure shown in FIG. 10, which is only an example.

A program in which an embodiment of the present invention is implemented may be provided through communication means, or may be provided by using a storage medium, such as a CD-ROM, storing the program.

As described above, with the present embodiment, in an operation of setting or changing a welding condition, when an operator inputs a new welding condition Win, the reliability Rin of the new welding condition Win relative the well-tested welding conditions Wn, which have been set in the past, is represented by a single numerical value. Thus, even a beginner can set a welding condition having a higher reliability, stability, and repeatability based on past experience. Therefore, the number of experimental welding steps, which are called condition setting steps, can be considerably reduced.

According to the present embodiment, in an operation of setting or changing a welding condition, when an operator inputs the new welding condition Win, whether the new welding condition Win is within the weldable limit Wlim is checked, and a warning is given to the operator if the new welding condition Win is outside the weldable limit Wlim. Thus, it is possible to prevent a problematic welding condition, with which welding cannot be performed or high weld quality cannot be obtained, from being set.

For example, the present embodiment is effective when it is required to make the welding speed as fast as possible in order to reduce the tact time. This is because, with the present embodiment, it is possible not only to check whether the welding speed exceeds its upper limit but also to easily obtain a welding condition that satisfies the requirement by adjusting the welding speed and the welding wire feed speed (welding current) before starting welding by checking the reliability Rin.

What is claimed is:

1. A setting assistance device for assisting setting of a welding condition, comprising:
   a receiving unit that receives a new welding condition that is specified; and
   an output unit that outputs, to a display unit, a degree of appropriateness of the new welding condition relative to a plurality of well-tested welding conditions, which are welding conditions that have been used in the past and well-tested, in response to reception of the new welding condition by the receiving unit,
   wherein the output unit outputs the degree of appropriateness in accordance with a degree of remoteness of the new welding condition from a measure of central tendency of the plurality of well-tested welding conditions, and
   wherein the degree of remoteness is a Mahalanobis distance between the measure of central tendency of the plurality of well-tested welding conditions and the new welding condition.

2. A setting assistance device for assisting setting of a welding condition, comprising:
   a receiving unit that receives a new welding condition that is specified; and
   an output unit that outputs, to a display unit, a degree of appropriateness of the new welding condition relative to a plurality of well-tested welding conditions, which are welding conditions that have been used in the past and well-tested, in response to reception of the new welding condition by the receiving unit,
   wherein the output unit divides welding conditions into a plurality of ranges on the basis of the plurality of well-tested welding conditions and sets the degree of appropriateness for each of the ranges, and the output unit outputs the degree of appropriateness set for one of the plurality of ranges that includes the new welding condition.

3. The setting assistance device according to claim 2, wherein the plurality of ranges are determined in accordance with a weighted sum of a plurality of items included in each of the plurality of well-tested welding conditions.

4. The setting assistance device according to claim 1, wherein the receiving unit further receives attribute information related to at least one of a welding material, a welding device, and a workpiece, and
   wherein the output unit outputs the degree of appropriateness in accordance with the attribute information.

5. A setting assistance method for assisting setting of a welding condition, comprising:
   receiving a new welding condition that is specified; and
   outputting a degree of appropriateness of the new welding condition relative to a plurality of well-tested welding conditions, which are welding conditions that have been used in the past and well-tested, in response to reception of the new welding condition
   wherein the outputting of the degree of appropriateness occurs in accordance with a degree of remoteness of the new welding condition from a measure of central tendency of the plurality of well-tested welding conditions, and
   wherein the degree of remoteness is a Mahalanobis distance between the measure of central tendency of the plurality of well-tested welding conditions and the new welding condition.

6. A setting assistance method for assisting setting of a welding condition, comprising:
   receiving a new welding condition that is specified; and
   outputting a degree of appropriateness of the new welding condition relative to a plurality of well-tested welding conditions, which are welding conditions that have been used in the past and well-tested, in response to reception of the new welding condition,
   wherein, during the outputting, welding conditions are output into a plurality of ranges on the basis of the plurality of well-tested welding conditions, the degree of appropriateness is set for each of the ranges, and the degree of appropriateness is set for one of the plurality of ranges that includes the new welding condition.

\* \* \* \* \*